July 25, 1972  D. C. LINTON ET AL  3,679,399
CONTINUOUS PROCESS TO PRECIPITATE HIGH PURITY COPPER
POWDER FROM ACID LEACHING LIQUORS CONTAINING
COPPER IN SOLUTION
Filed Nov. 10, 1970
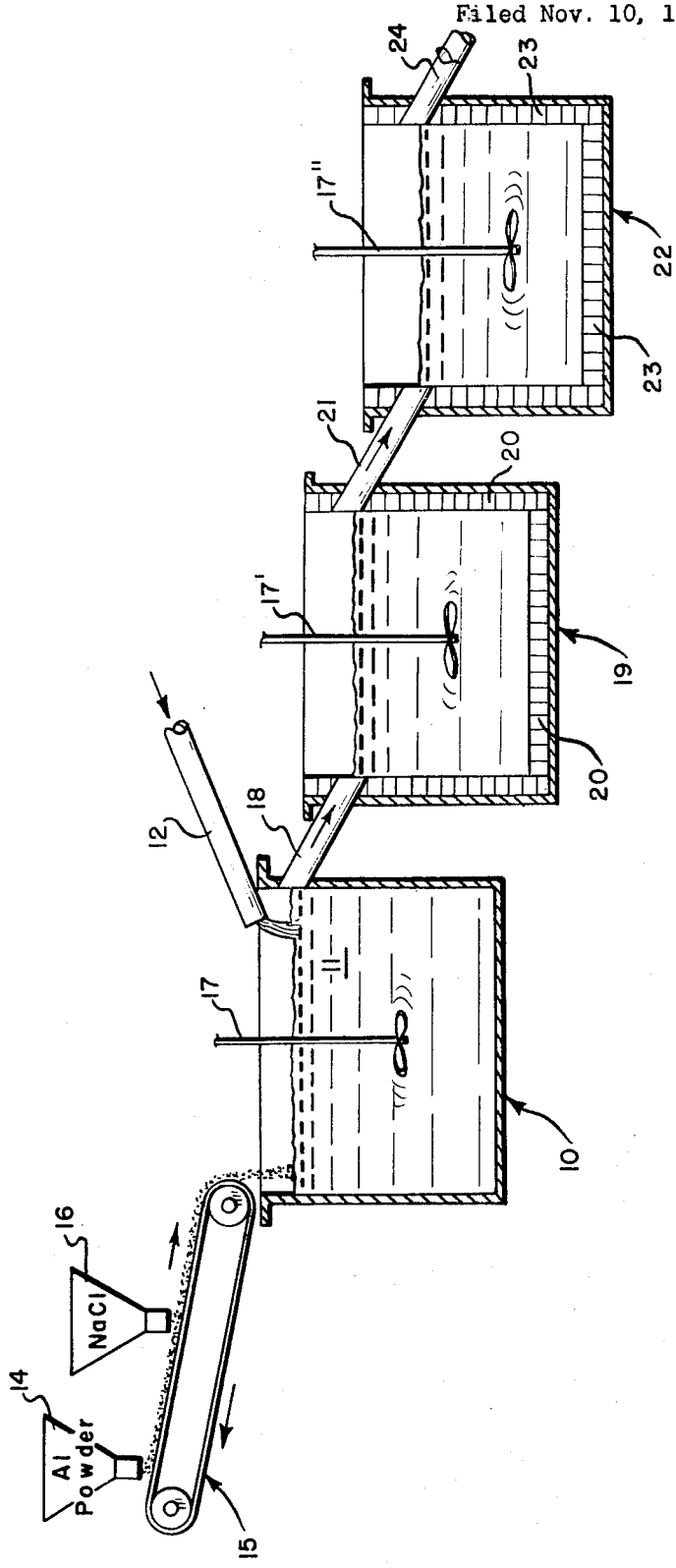
INVENTORS
DENTON C. LINTON
ANDREW J. ZINKL
JACK C. BALLAM
BY *Pennie Edmonds*
*Morton, Taylor and Adams*
ATTORNEYS

United States Patent Office 3,679,399
Patented July 25, 1972

---

3,679,399
CONTINUOUS PROCESS TO PRECIPITATE HIGH PURITY COPPER POWDER FROM ACID LEACHING LIQUORS CONTAINING COPPER IN SOLUTION
Denton C. Linton, Salt Lake City, Utah, Andrew Zinkl, Prescott, Ariz., and Jack Ballam, Moab, Utah, assignors to Micro Copper Corporation
Continuation-in-part of abandoned application Ser. No. 841,477, July 14, 1969. This application Nov. 10, 1970, Ser. No. 88,465
Int. Cl. C22b *15/12*
U.S. Cl. 75—109                                                        6 Claims

ABSTRACT OF THE DISCLOSURE

A method of precipitating copper powder continuously from an acid leaching liquor is disclosed comprising steps of adding aluminum powder to a copper pregnant liquor solution together with sodium chloride as a catalyst, the aluminum powder displacing and causing precipitation of most but not all the copper from the solution, the remaining copper being subsequently precipitated by interaction with aluminum ingots.

---

FIELD OF THE INVENTION

This invention relates to the production of copper and, more particularly, to a method and apparatus for producing high purity copper powder by a precipitation technique from acid leaching liquors containing copper in solution.

This application is a continuation-in-part of copending application Ser. No. 841,477, filed July 14, 1969, which is now abandoned.

BACKGROUND OF THE INVENTION

Conventionally and historically, copper has been precipitated from acid leaching liquors containing copper in solution by using iron to displace the copper in solution. The iron has usually been in the form of low cost scrap, such as treated waste tin cans or shredded automobile bodies. The copper resulting from this process is called cement copper and is usually about 80–90% pure copper. This product cannot be easily upgraded to produce commercially high purity copper, i.e., copper of 99+% purity.

Copper of a higher purity than the above-described cement copper can be produced from acid leaching liquors containing copper in solution by using aluminum to displace or precipitate copper from the solution if chloride ions are present to catalyze the reaction. The advantages of precipitating with aluminum instead of iron is that with aluminum the product can be upgraded to produce a very high purity product without complicated processing and at a reasonable cost. However, the product produced by precipitation with aluminum in the presence of hydrochloric acid normally contains from 2–5% chloride as a contaminant unless specific precautions are taken to remove completely copper ions from the mother liquor.

To precipitate a good grade of copper using aluminum from an acid leaching liquor containing copper in solution, requires a close balance between the amount of aluminum added and the amount of copper in solution. Aluminum is added in the form of powder or small particles to obtain a satisfactory rate of reaction. If excess aluminum is added, the copper powder produced will be contaminated with aluminum particles. A batch process technique has been employed in which powdered aluminum was added in just sufficient quantity to precipitate most of the copper in solution while all of the aluminum was used up so that none contaminated the copper product precipitate. In this process the leaching solution still retained a small percentage of copper in solution; in other words, not all of the copper was removed. A more serious disadvantage resulted from the fact that copper chloride was present as an undesirable contaminant, since cupric and cuprous ions are still present in solution as well as metallic copper in suspension. The chloride content can be minimized by decreasing the concentration of the chloride catalyst in solution but cannot be totally eliminated, nor can the chloride be removed by subsequent washing of the copper product precipitate.

The present invention is primarily directed to refinements of the above-described process using aluminum to precipitate copper from a copper pregnant acid leaching liquor. In accordance with the invention, a good grade of copper is produced and chloride as a contaminant is easily subsequently removed by washing.

It is a further purpose of the present invention to provide a continuous rather than a batch process for the production of high quality copper.

SUMMARY OF THE INVENTION

The present invention comprises a method and apparatus for continuously producing a high quality copper precipitate from an acid leaching liquor containing copper in solution. According to the method of the invention, aluminum powder in a calculated amount is added to an acid leaching liquor containing copper in solution, together with sodium chloride as a catalyst. The amount of aluminum powder added is insufficient to remove all of the copper from the solution. The solution is continuously agitated in a first tank to maintain the precipitated copper particles in suspension and the solution is transferred to a second tank where good contact between aluminum ingot and solution is maintained. Additional copper is precipitated from the solution in the presence of the aluminum ingots and, again, the solution is continuously agitated to maintain the copper precipitate in suspension. The solution containing the precipitate is transferred to a third or more tank having, again, good contact with between aluminum ingot and solution wherein all of the copper is precipitated from solution. The solution bearing the copper precipitate in suspension is removed for subsequent processing to remove the copper powder and the chloride contaminant from the copper powder.

BRIEF DESCRIPTION OF THE DRAWING

The figure illustrates schematically apparatus for carrying out the method of the present invention including a series of connected tanks for continuously processing an acid leaching liquor containing copper in solution.

DESCRIPTION OF THE PREFERRED EMBODIMENT

Referring to the drawing, there is schematically illustrated an apparatus for carrying out the method according to the present invention. Three interconnected tanks have been shown; however, the number of tanks is not to be considered as critical. The first tank, which has been identified generally by reference numeral 10, is initially filled with an acid leaching liquor 11 containing copper in solution by means of conduit 12 connected to a source of pregnant liquor (not shown). The acid employed, for example, may be hydrochloric acid and it has been found that a liquor containing about forty grams per liter of copper in solution is preferred. However, solutions of lesser or greater concentration may be used. For example, solutions of twenty grams per liter of copper in solution have been processed satisfactorily.

To the liquor 11 in tank 10 is added a calculated quantity of granular aluminum. This has been illustrated in the drawing as flowing from a hopper 14 which deposits the granular aluminum on a continuous vibratory feeder 15 which should be provided with a suitable flow rate control. Common salt (NaCl) will also be deposited from a second hopper 16 upon the feeder 15 preferably at the rate of 25% of the feed rate of the granular aluminum. The quantity of aluminum added is just enough so that the aluminum will be completely used up by displacement of copper in solution while the liquor subsequently contains between one and three grams per liter of copper in solution. The reaction is exothermic so that the temperature of the solution will increase to nearly 190° F. with a concentration of copper in solution of forty grams per liter. Additional pregnant liquor at a rate in the order of twenty-five gallons per minute is allowed to flow into tank 10 through conduit means 12 in order to maintain a continuous process. An agitator 17 assures that any copper precipitated will be maintained in suspension.

As the process continues and additional liquor is added to tank 10, the now weak copper bearing solution with suspended particles of copper therein will flow through the connecting means 18 from tank 10 to a second tank 19. The tank 19 is similarly equipped with an agitator 17' and has lining its bottom and sides a series of aluminum ingots 20. These assure continued displacement of copper from the solution without the overaddition of aluminum thereto. The solution, which has become nearly barren (containing, say, 1 to 3 grams per liter of copper) and which contains copper particles in suspension, is thereafter transferred on a continuous basis by means of interconnecting conduit 21 to a third tank 22 similar in construction to tank 19. Tank 22 is equipped with an agitator 17" and is lined with aluminum ingots 23.

The liquor while in tank 22 will become completely barren of copper and will leave tank 22 by means of conduit 24 while containing the copper powder in suspension. Thereafter, the barren solution will be further processed to remove the copper powder and by washing to remove any chloride contaminant.

It will be seen that the method according to the present invention permits complete removal of copper by precipitation from a copper bearing solution without contaminating the product with excess aluminum. Since the copper is entirely removed, the contamination by chlorides is significantly different from that which would have occurred had cuprous or cupric ions been present, as would be the case where less aluminum was used than that necessary to render the solution barren. When a completely barren condition is reached, the suspended copper is filtered and washed free of chloride. Elimination of such chloride from the product cannot be achieved easily unless the barren condition is reached. Furthermore, the method of the invention permits copper powder of a high quality to be continuously processed.

It will be understood that the foregoing description relates to a preferred embodiment and is therefore merely representative. In order to fully appreciate the spirit and scope of the invention, reference should be made to the appended claims.

We claim:

1. A continuous process to precipitate copper powder from an acid leaching liquor containing copper in solution comprising the steps of adding in the first zone particulate aluminum and a chloride catalyst to said solution in a sufficient amount to reduce the concentration of copper in the solution while permitting the retention of a relatively small quantity of copper in solution, transferring the weak copper bearing solution to at least one additional zone and exposing the weak copper bearing solution to the presence of solid bar aluminum to render the solution completely barren of copper ions, the completely barren solution containing the formed elemental copper powder.

2. The process according to claim 1 further including the steps of removing the formed copper powder from the completely barren solution and washing the copper powder to remove any chloride contaminate while maintaining the solution in a barren condition.

3. The process according to claim 1 wherein the catalyst is sodium chloride.

4. The process according to claim 3 wherein the proportion of aluminum powder to catalyst is approximately in the ratio of 4:1 by volume.

5. The process according to claim 1 wherein said solution is being constantly agitated to maintain formed precipitated copper in suspension.

6. The process according to claim 5 wherein the initial solution containing copper has a concentration of copper from approximately 40 grams of copper per liter to approximately 20 grams of copper per liter, and a catalyst of sodium chloride is added in proportion to aluminum powder in the ratio of approximately 1:4 by volume, said weak copper bearing solution having an initial concentration of approximately 1 to 3 grams of copper per liter.

References Cited

UNITED STATES PATENTS 3,386,818    6/1968    Hudson _____ 75—117

FOREIGN PATENTS 276,017    1/1928    Great Britain _____ 75—117

GEORGE T. OZAKI, Primary Examiner

U.S. Cl. X.R.

75—.5 A, 117